Patented Jan. 4, 1949

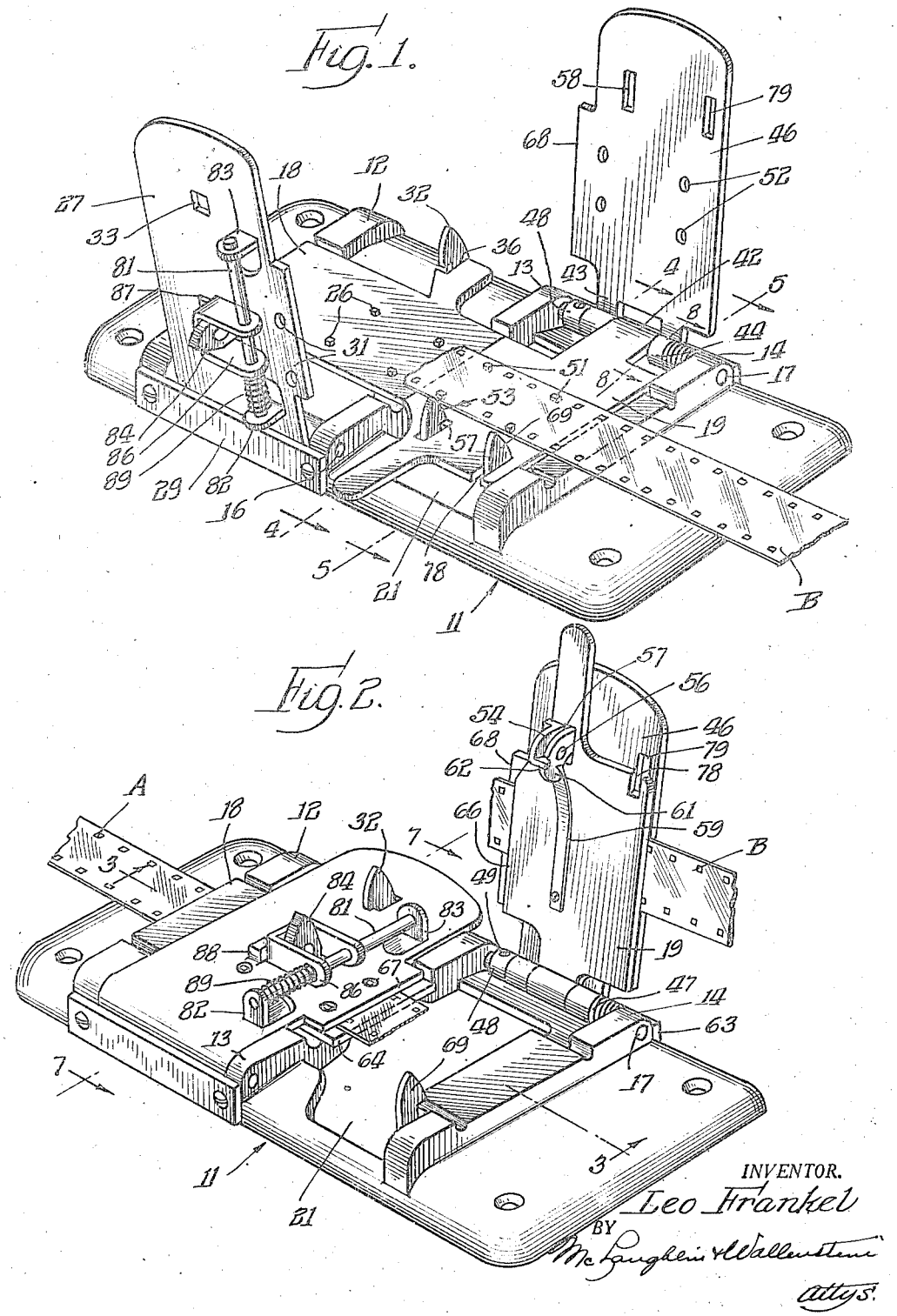

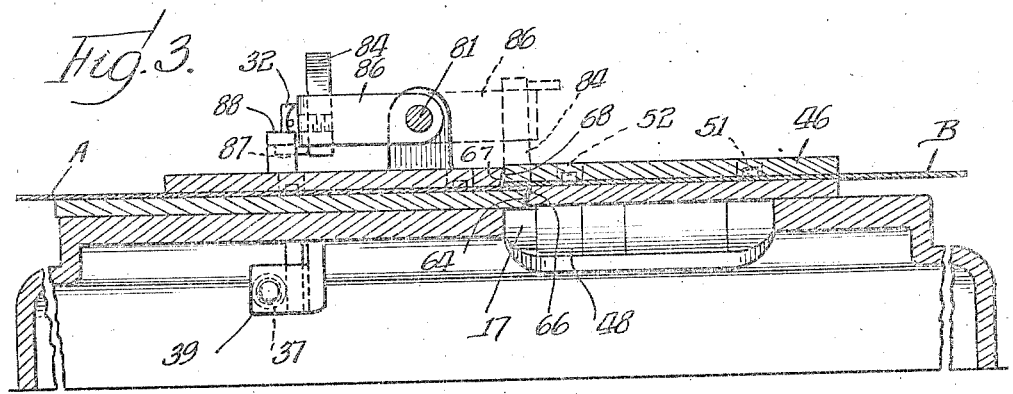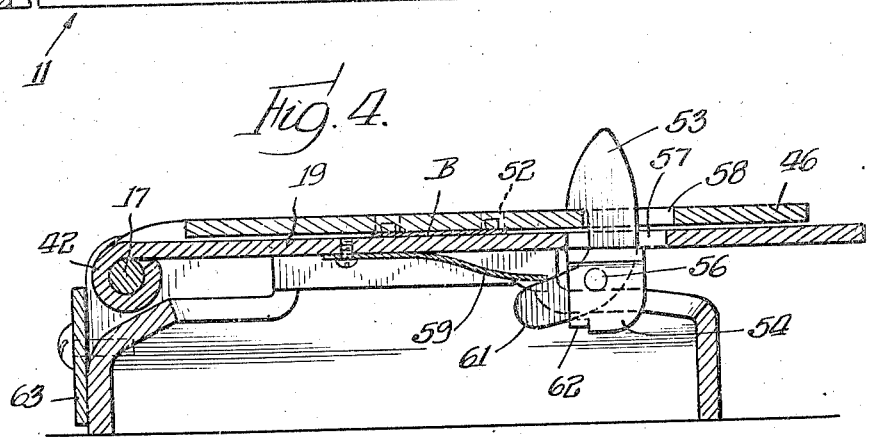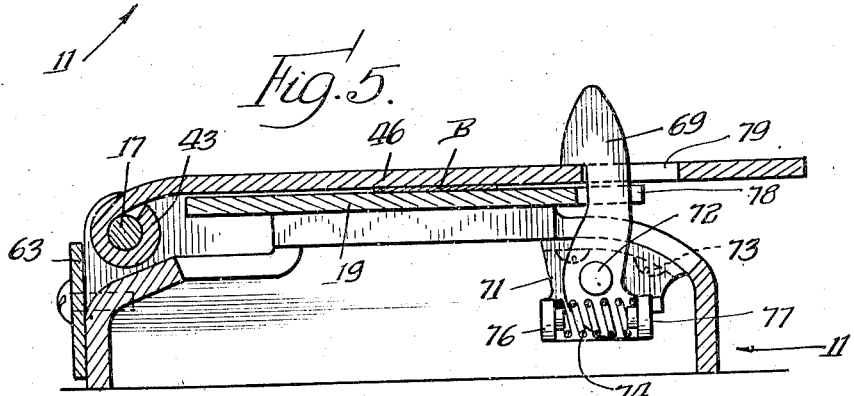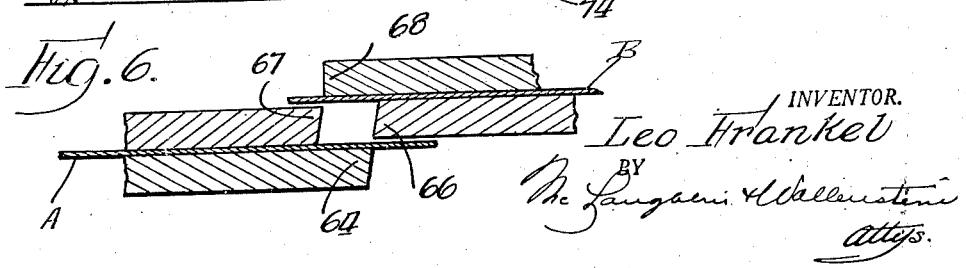

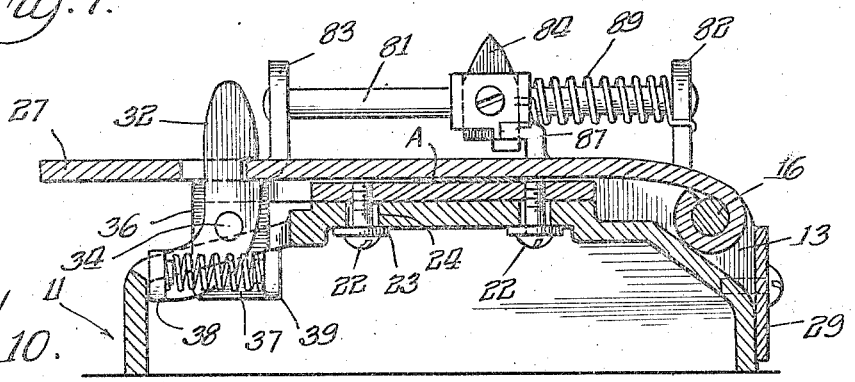
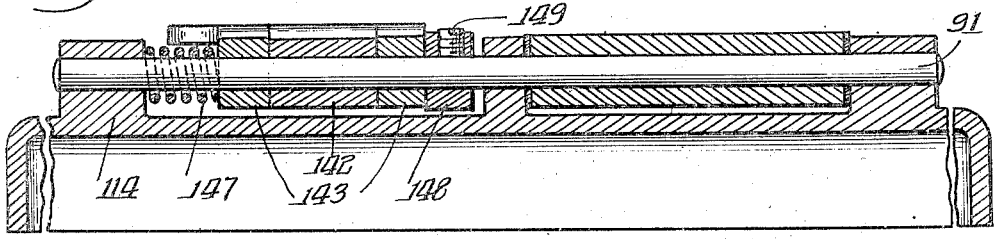
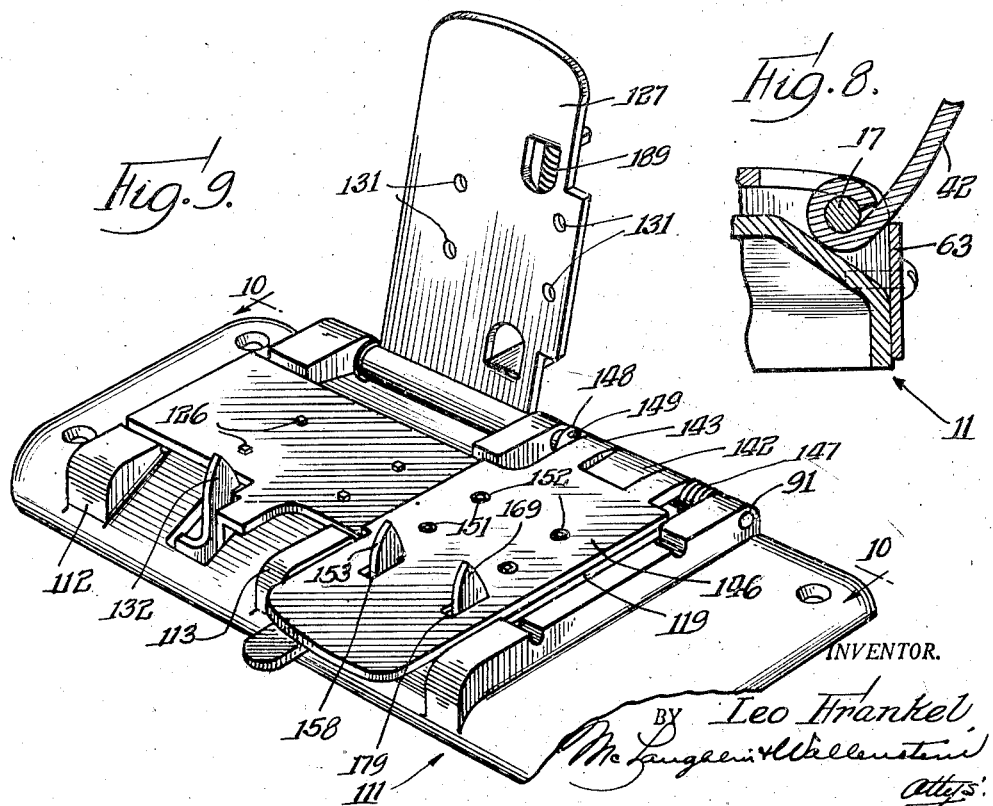

2,457,995

UNITED STATES PATENT OFFICE 2,457,995

FILM SPLICER

Leo Frankel, Chicago, Ill., assignor, by mesne assignments, to City National Bank and Trust Company of Chicago, as trustee Application February 21, 1945, Serial No. 579,031

4 Claims. (Cl. 154—42.1)

My invention relates in general to film splicers. It relates more in particular to an improved splicer for photographic film of a type wherein the ends of the film are cut off and an overlapping portion, on which cement has been applied, held together until released.

The object of the invention is the provision of an improved film splicer of the type identified wherein various improved features and advantages are utilized as will be explained in the course of the description which follows.

In the drawings—

Fig. 1 is a perspective view of a preferred form of film splicer embodying features of the present invention, the clamping plates of the two film holding assemblies being in unlatched position;

Fig. 2 is a similar perspective view with the clamping plates in latched relation with their associated base plates but with the movable film holding assembly in latched position, the two Figures 1 and 2 illustrating a sequence of operations in splicing a film;

Fig. 3 is an enlarged fragmentary longitudinal sectional view taken along the line 3—3 of Fig. 2, looking in the direction of the arrow;

Fig. 4 is an enlarged transverse sectional view taken on the line 4—4 of Fig. 1, looking in the direction of the arrows with the clamping plate closed;

Fig. 5 is an enlarged transverse sectional view taken on the line 5—5 of Fig. 1, looking in the direction of the arrows with the clamping plate closed, the line 5—5 of Fig. 3 also indicating the position at which the section is taken;

Fig. 6 is an enlarged fragmentary sectional view, being a portion of the section comprising Fig. 3 but showing the base plates and clamping plates in the positions which they assume immediately before the cutting of the film;

Fig. 7 is an enlarged transverse sectional view taken on the line 7—7 of Fig. 2 looking in the direction of the arrows, the figure showing a part of a scraper mechanism in elevation;

Fig. 8 is a fragmentary enlarged transverse sectional view taken on the line 8—8 of Fig. 1;

Fig. 9 is a perspective view showing a slightly modified form of the invention, a portion of the view being broken away to conserve space; and Fig. 10 is an enlarged sectional view taken on the line 10—10 of Fig. 9.

In accordance with the general features of the invention, the splicer of my invention comprises a base member carrying two film holding assemblies, each comprising a base plate and a clamping plate, each clamping plate being pivoted on a rod running longitudinally of the splicer and supported in the ends of transverse ribs forming a part of the base member. One of the base plates is also pivoted to one of such rods so that the movable film holding assembly comprising a clamping plate and pivoted base plate is pivoted as a unit and spring means is provided for forcing it toward the fixed film holding assembly. The base plates and clamping plates are overlapping in such a manner that the two film ends are simultaneously cut and held in overlapping relation. Latch means is provided to positively lock the clamping plates and base plates together when a film is supported therebetween, and separate latching means is provided to hold the pivoted film holding assembly in film holding and cementing position. A novel form of scraper is carried by the fixed film holding assembly and is mounted in position to scrape the emulsion from that portion of the lowermost film end which overlaps the upper film end.

The detailed features of the invention will be better understood from the description of the preferred embodiment shown in Figs. 1 to 8, inclusive, of the drawings. Here the base member 11, which may comprise a suitable casting or forging, has three transverse ribs 12, 13 and 14 which function as supports for pivot pins or rods 16 and 17, as will be more fully described, and also have other functions which will be alluded to as the description proceeds. The base member 11 may be supported in a suitable manner, as by means of screws, to a wooden or like base, not shown. The center portion of the base member 11 is raised to provide a support for the fixed and pivoted base plates 18 and 19, respectively, but a major portion of the base member is left open as indicated at 21 (Fig. 2) to permit film cuttings to drop through. The specific shape of the base member 11 is indicated in Figs. 1 and 2 but is shown also in part in Figs. 3, 4, 5 and 7. As shown in the latter figure, the fixed base plate 18 rests directly on the raised center portion of the base member 11 and is held in position by screws 22. These screws extend through washers 23 and relatively wide openings 24 in the base member so that the base plate 18 will be held rigidly in position when the screws 22 are tightened, but its position may be adjusted sufficiently to facilitate alignment of cutting edges and the like. Projections 26 on the upper surface of the base member 18 are adapted to engage in the usual side perforations of the film to hold the same in position.

Associated with the base plate 18 is a clamping plate 27, this clamping plate having a turned end engaging around the rod 16 to form a hinge. A stop strip 29 is secured to the base member 11 and disposed between ends of the ribs 12 and 13 so that the clamping plate 27 will normally remain in the attitude indicated, when in open position, in Fig. 1. The clamping plate 27 has apertures 31 into which the projections 26 may extend so that a film section A (Fig. 2) can be clamped tightly between the base plate 18 and the clamping plate 27. To maintain this position, as indicated in Fig. 2, I utilize a latch 32 extendable through an opening 33 in the clamping plate 27 and having a latch projection engaging over the top surface of the clamping plate 27 as illustrated in Fig. 2. The latch 32 is pivoted on a pin 34 carried by a downwardly extending portion 36 of the base plate 18. A compression spring 37 is supported between a pair of fingers 38 and 39 formed integral with the latch 32 and portion 36, respectively. As shown, particularly, in Fig. 7, the spring imparts a latching action to the latch member 32 to thereby hold it in engagement with the clamping plate 27. The base plate 19 is pivoted to the rod 17, the pivot formed by a shaped portion 42 disposed between hinge pieces 43 and 44 forming a part of a clamping plate 46. A coil spring 47 is compressed between the hinge member 44 and the rim 14 supporting one end of rod 17 so that by its compression the spring 47 tends to force the pivoted film holding assembly (comprising the base plate 19 and clamping plate 46) toward a stop member 48 surrounding rod 17 and held in set position thereon by set screw 49.

The film end B is positioned by projections 51 on the upper face of the clamping plate 19 and holes 52 in the clamping plate receive the projections so that the film end B can be clamped securely between such base plate and clamping plate. To maintain the parts in film clamping relation independently of the position of the film holding assembly (note Fig. 2, for example), I pivot a latch 53 on a bracket 54 carried on the bottom of the base plate, a pivot pin 56 extending through these two members. The latch 53 projects upwardly through a slot 57 in the base plate 19 and is adapted also to project through a slot 58 in the clamping plate 46 to engage the top surface thereof and hold the clamping plate to the base plate in the manner shown in Fig. 4. The latch is urged toward locking position by a leaf spring 59 which engages under a tail piece 61 of the latch, such tail piece 61 being also adapted to engage against an ear 62 on the bracket 54 which functions as a stop to limit the pivotal movement of the latch.

Base plate 18 and clamping plate 27 comprise a fixed film holding assembly held in film clamping position by the latch 32. The base plate 19 and clamping plate 46 comprise a pivotally movable film holding assembly held in film clamping position by the latch 53 and adapted to swing as a unit about the pivot rod 17 to the position shown in Fig. 2. A stop strip 63 is fastened to the base member between the ribs 13 and 14 holds the pivoted film holding assembly in an upright position as shown in Fig. 2 when required in connection with the functioning of the device.

The base plates and clamping plates of the two film holding assemblies are provided with straight edges 64, 66, 67 and 68, pairs of which cooperate to cut two film ends at the same time. The four plates comprising the two film holding assemblies are mutually overlapping as shown, the pivoted clamping plate 46 overlapping the fixed base plate 18 a distance equal to the width of a desired splice so that the straight edge 68 cooperates with the straight edge 67 to cut the end of the film section B and the straight edge 64 cooperates with the straight edge 66 to cut the end of the film section A. The spring 47 urges the straight edges into intimate contact with each other but the stop 48 limits the movement to prevent appreciable overlapping of the mutually cooperating straight edges.

Independent latch means are provided for holding the pivoted film holding assembly in a horizontal position after the film ends have been cut. This comprises a latch 69 pivotally carried by a bracket 71 (see Fig. 5) having a pivot pin 72. This bracket is secured to the underside of the base member 11 by screws 73. A spring 74 is compressed between tail pieces 76 and 77 carried on the bracket and latch, respectively, and tends to rotate the latch in a counterclockwise direction as seen in Fig. 5. The latch projects through an edge opening 78 in the pivoted base plate 19 and through a slot 79 in the clamping plate 46 and projects beyond the periphery of such slot 79 to engage the upper surface of the clamping plate. Since the clamping plate 46 is locked to the base plate 19 by the latch 53, the latch 69 acts as a locking mechanism for the entire pivoted film holding assembly as a unit.

A novel scraper is carried above the clamping plate 27 on a transverse rod 81 supported above the surface of the base plate by a pair of ears 82 and 83 struck up from the material of the clamping plate. The scraper comprises a sharpened wedge 84 secured to a U piece 86, the ends of which are apertured to receive the rod 81. The U piece 86 has a projection 87 adapted to engage under a stop 88 formed from the material of the clamping plate 27. A coil spring 89 has one end secured to the U piece 86 and the other end to the ear 82. The spring 89 is normally under tension and has a tendency to pull the scraper toward the front of the splicer and toward the stop 88. It also has the tendency to rotate the scraper into contact with the film so that when the projection 87 is released from the stop 88 the scraper will move into contact with the film. It will be noted that the wedge 84 has only a single scraping edge, in the drawing shown as running parallel to the longitudinal axis of the film. This is the simplest and least expensive manner of producing the cutting edge but considerable deviation is permitted without affecting the scraping action. The surfaces terminating in the sharp scraping edge, I have found, must define an angle of between about 75 and about 90 degrees (and preferably between 80 and 85 degrees) to produce a satisfactory scraping action and at the same time avoid tearing of the film. The scraper wedge is preferably formed of hardened tool steel ground to the shape shown. This simple form of scraper I have found to be most effective in its scraping action and to have much less tendency to tear a film than scrapers heretofore employed.

It will be noted that while the base member 11 is relatively light in construction, the arrangement is such as to produce a very sturdy support for the base plates and clamping plates. Heretofore in a quality long lasting film splicer, it has been considered necessary to employ a relatively heavy construction. This not only has increased the cost but has resulted in the production of a relatively cumbersome article.

When using the splicer of my invention, the film section B of a broken film is first placed in position on the base plate 19 while the two clamping plates are in raised position as shown in Fig. 1. The clamping plate 46 is then closed and the pivoted film holding assembly then raised to the position shown in Fig. 2. The film section A is then placed in position on the base plate 18 and the clamping plate 27 closed. The parts are now in the position shown in Fig. 2. The scraper is then released, the emulsion scraped from the film at the place where the splice is to occur, the scraper returned, a requisite amount of cement applied to the scraped portion of the film, and the pivoted film holding assembly moved to a horizontal position until the latch 69 engages the base plate 19. This latter operation simultaneously cuts the film ends and brings the ends in overlapping splicing relation. The latch locks the parts in position where they are allowed to remain a sufficient time to permit the film cement to dry. Fig. 6 illustrates the position of the parts just before the cutting takes place and from this figure it will be clear what parts of the film ends are cut and what are held together when the splice is made.

In Figs. 9 and 10, I show a modified form of the invention in which a single rod 91 acts as a pivot for the clamping plate of the fixed film holding assembly and the clamping plate and base plate of the pivoted film holding assembly. It will be noted that the construction is substantially identical with the previously described embodiment except that all of the parts are pivoted on one side instead of on opposite sides. To show the correspondence I have merely applied to Figs. 9 and 10 the same reference characters used in the first described embodiment with, however, the prefix "1" to indicate the modification.

What I claim as new and desire to protect by Letters Patent of the United States is:

1. A film splicer comprising a base member having a plurality of transverse ribs, a base plate secured to said base member, a rod secured between two of said ribs, said rod extending longitudinally of the base member along one edge thereof, a clamping plate hinged to said rod for cooperating with said secured base plate to form a fixed film holding assembly, a second rod secured between two of said ribs and extending along an edge of the base member opposite to that of said first rod, the axis of said rods being parallel, a base plate pivoted to said second rod, a clamping plate also pivoted to said second rod, the said pivoted base plate and last mentioned pivoted clamping plate comprising a pivoted film holding assembly, the base plates and clamping plates of said two film holding assemblies having contiguous straight cutting edges and being in such mutually overlapping relation that two film ends may be cut at the same time and held with the cut ends overlapping.

2. A film splicer comprising a base member having a plurality of transverse ribs, a base plate secured to said base member, a rod secured between two of said ribs, said rod extending longitudinally of the base member along one edge thereof, a clamping plate hinged to said rod for cooperating with said secured base plate to form a fixed film holding assembly, a second rod secured between two of said ribs, and extending along an edge of the base member opposite to that of said first rod, the axis of said rods being parallel, a base plate pivoted to said second rod, a clamping plate also pivoted to said second rod, the said pivoted base plate and last mentioned pivoted clamping plate comprising a pivoted film holding assembly, the base plates and clamping plates of said two film holding assemblies having contiguous straight cutting edges and being in such mutually overlapping relation that two film ends may be cut at the same time and held with the cut ends overlapping and a spring pressed latch carried by each base plate to positively lock the associated clamping plate thereto.

3. A film splicer comprising a base member having a plurality of transverse ribs, a base plate secured to said base member, a rod secured between two of said ribs, said rod extending longitudinally of the base member along one edge thereof, a clamping plate hinged to said rod for cooperating with said secured base plate to form a fixed film holding assembly, a second rod secured between two of said ribs and extending along an edge of the base member opposite to that of said first rod, the axis of said rods being parallel, a base plate pivoted to said second rod, a clamping plate also pivoted to said second rod, the said pivoted base plate and last mentioned pivoted clamping plate comprising a pivoted film holding assembly, the base plates and clamping plates of said two film holding assemblies having contiguous straight cutting edges and being in such mutually overlapping relation that two film ends may be cut at the same time and held with the cut ends overlapping, a spring pressed latch carried by each base plate to positively lock the associated clamping plate thereto, and a spring pressed latch carried by the base member and engaging a top surface of the pivoted film holding assembly to hold the said pivoted film holding assembly in closed position in contact with the fixed film holding assembly.

4. A film splicer comprising a base member having a plurality of transverse ribs, a base plate secured to said base member between two of said ribs, a rod secured between said two ribs, said rod extending longitudinally of the base member along one edge thereof, a clamping plate hinged to said rod for cooperating with said secured base plate to form a fixed film holding assembly, a second rod secured between two of said ribs and extending along an edge of the base member opposite to that of said first rod, the axis of said rods being parallel, a base plate pivoted to said second rod and lying between two ribs adjacent said first mentioned base plate, a clamping plate also pivoted to said second rod, the said pivoted base plate and last mentioned pivoted clamping plate comprising a pivoted film holding assembly, the base plates and clamping plates of said two film holding assemblies having contiguous straight cutting edges and being in such mutually overlapping relation that two film ends may be cut at the same time and held with the cut ends overlapping, a spring pressed latch carried by each base plate and engaging a top surface of the associated clamping plate to positively lock the said associated clamping plate to its base plate, a spring pressed latch carried by the base member and engaging a top surface of the pivoted film holding assembly to hold the pivoted film holding assembly in closed position in contact with the fixed film holding assembly, coil spring means in said second rod urging said pivoted film holding assembly on said rod toward the fixed film holding assembly, and an adjustable stop to limit such movement.

LEO FRANKEL.

(References on following page)

REFERENCES CITED

The following references are of record in the file of this patent:

UNITED STATES PATENTS

| Number | Name | Date |
|---|---|---|
| 1,209,339 | Schippers et al. | Dec. 19, 1916 |
| 1,331,563 | Genter | Feb. 24, 1920 |
| 1,464,264 | Griswold | Aug. 7, 1923 |
| 1,464,265 | Griswold | Aug. 7, 1923 |
| 1,490,286 | Miehling | Apr. 15, 1924 |
| 1,672,542 | Rohrdanz | June 5, 1928 |
| 2,367,330 | Bolsey | Jan. 16, 1945 |
| 2,394,317 | Matson | Feb. 5, 1947 |

FOREIGN PATENTS

| Number | Country | Date |
|---|---|---|
| 426,424 | Great Britain | Apr. 3, 1935 |
| 488,330 | Great Britain | July 5, 1938 |